Dec. 25, 1945. A. F. WARD 2,391,660

BAKING PAN

Filed Dec. 18, 1943

INVENTOR
Ashley F. Ward

Patented Dec. 25, 1945

2,391,660

UNITED STATES PATENT OFFICE 2,391,660

BAKING PAN

Ashley F. Ward, Cincinnati, Ohio

Application December 18, 1943, Serial No. 514,787

1 Claim. (Cl. 126—390)

This invention relates to baking pans. It has to do primarily with pans for baking loaves of bread and especially pans for use in commercial bakeries and which are being constantly used and are subjected to considerable wear and tear in handling. The invention relates to baking pans having at least their outside surfaces rendered readily absorptive to radiant heat, as, for example, baking pans made out of black oxide coated sheet metal, ordinarily steel, which is known in the art as blue pan sheet, or out of aluminum having at least the surface thereof disposed outwardly of the pan rendered readily absorptive to radiant heat.

Modern bakeries are equipped with ovens designed to bake loaves of bread by radiant heat. To obtain the maximum efficiency in such ovens baking pans having at least their outside surfaces rendered readily absorptive to radiant heat are used. However, difficulty has been encountered in the use of such baking pans in that there is a tendency toward overbaking of the generally vertical edges of the loaves baked therein. This is believed to be because the generally vertical edges of the loaves are exposed to and absorb heat from two sides in a comparatively small cross section of the bread and the heat thus absorbed is not conducted away fast enough to prevent undesirable overbaking.

I obviate the disadvantage above explained which is inherent in the use of baking pans of the type mentioned by applying baking retarding patches to the generally vertical edges of the pans. They are preferably made of metal whose outer surface has less heat absorptivity than the outer surface of the metal of the pans and may desirably be made of heat reflecting metal, as, for example, bright aluminum or tin plate, which tends to reflect rather than absorb heat and thus substantially reduce the amount of heat transmitted to the generally vertical edges of the loaves.

I preferably form a baking pan out of a sheet of metal, for example, black oxide coated sheet steel or aluminum having at least the outer surface thereof rendered readily absorptive to radiant heat, by cutting the corners out of a generally rectangular blank and bending up the sides so that their edges butt together at the generally vertical edges of the pan. This method of pan formation is especially desirable in using oxide coated metal or blue pan sheet because the metal is not subjected to envelope folds which crack the oxide and start it to peeling, which ultimately leads to corrosion. The patches applied at the generally vertical edges of the pans serve to complete the joints at such edges and assist in protecting the pans during handling.

Preferably the patches have small localized projections which contact with small localized portions of an adjacent pan when pans are nested, thereby reducing to a minimum the area of contact between nested pans. Pans used in commercial bakeries are not washed after each use as the insides of the pans remain substantially clean. The outsides of the pans, however, become somewhat dirty. By reducing to a minimum the area of contact between nested pans I make it possible to use pans a greater number of times without washing as with the limited contact very little dirt from the outside of one pan is transferred to the inside of another pan nested therewith.

Other details, objects and advantages of the invention will become apparent as the following description of certain present preferred embodiments thereof proceeds.

Figure 1:
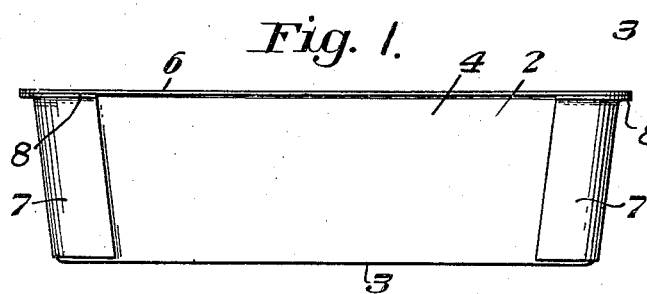
Fig. 1 is a side elevation of a baking pan embodying the invention.
Figure 2:
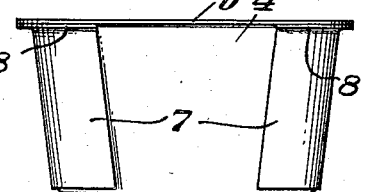
Fig. 2 is an end elevation of the pan shown in Fig. 1.
Figure 3:
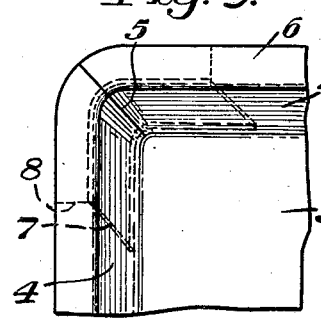
Fig. 3 is a fragmentary plan view to enlarged scale of a corner of the pan shown in Figs. 1 and 2.

Referring now to the illustrated embodiment of the invention, the pan is, except for the patches presently to be described, made of metal having at least its outside surface rendered readily absorptive to radiant heat. For purposes of illustration the pan will be considered as being made of black oxide coated sheet steel. It is made out of a generally rectangular blank with the corners cut out and the sides are turned up with their edges abutting at the generally vertical edges of the pan. The pan is designated generally by reference numeral 2, its bottom being shown at 3 and its sides at 4. The pan is longer in one direction than in the other so as to be adapted for the baking of a loaf of bread of the usual oblong shape. The sides 4 of the pan butt together at 5.

A generally horizontal outwardly projecting flange 6 is formed about the top rim of the pan.

Patches 7 are applied to the pan along its generally vertical edges. The patches are shown in the drawing as being applied exteriorly to the generally vertical edges of the pan 2. Each of the patches is of generally angular cross section with an outwardly projecting flange 8 at the top so that it snugly fits over one of the generally vertical edges of the pan. The flange 8 of the patch lies against the under surface of the flange 6 of the pan, and the length of the patch is approximately equal to or very slightly less than the length of the generally vertical edge of the pan to which it is applied. The patch may be connected with the pan in any suitable manner, as, for example, by spot welding. It completes the generally vertical edge joint of the pan as well as strengthening the pan and serving as a shock absorbing wear resisting member when pans are handled and stacked.

The patches 7 act as baking retarding patches, preventing overbaking of the generally vertical edges of loaves baked in the pans. The patches are made of metal having less heat absorptivity than blue pan sheet and act as heat reflecting patches to reflect a portion of the heat during baking. The patches may be made of any suitable material, as, for example, bright aluminum or tin plate. The patches provide two thicknesses of metal at the corners of the pans, thus farther retarding the flow of heat to the corners of the loaves where it is desired to prevent overbaking.

Figure 5:
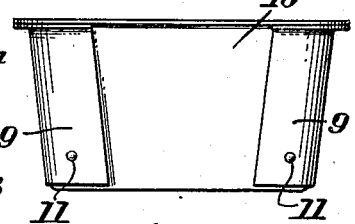
Fig. 5 is an end elevational view similar to Fig. 2 showing a modified construction.
Figure 4:
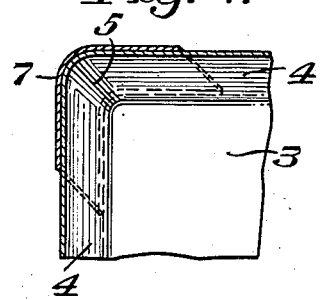
Fig. 4 is a fragmentary horizontal cross-sectional view on an enlarged scale of a corner of the pan shown in Figs. 1, 2 and 3.
Figure 6:
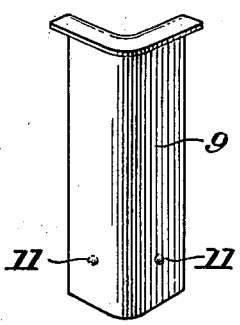
Fig. 6 is a perspective view of one of the patches which is applied to the generally vertical edges of the pan shown in Fig. 5.

In Figures 5 and 6 there is shown a modified construction in which patches 9 are applied to the generally vertical edges of a pan 10 in the same manner as the patches 7 are applied to the pan 2, but each of the patches 9 has a small localized outward projection 11 adapted to contact with the inside of an underlying pan when the pans are nested. With this form of structure the area of contact between the pans is substantially limited to the contact of the ends of the projections 11 with the inner surface of the outer pan. Thus there is very little opportunity for dirt accumulated on the outside of a pan to be transferred to the inside of another pan when the pans are nested.

As above pointed out, the pan body may be made of any metal having at least its outside surface rendered readily absorptive to radiant heat. Black oxide coated sheet metal, i. e., blue pan sheet, and aluminum having at least the outer surface thereof rendered readily absorptive to radiant heat have been given as examples. When aluminum as specified is used for making the pan body the surface of the aluminum facing inwardly of the pan is preferably bright. A bright aluminum surface next the loaf is highly desirable from the standpoint of cleanliness; also, a bright aluminum surface requires greasing only about one-fourth or one-fifth as often as other surfaces disposed next the loaves employed in baking pans.

The outer surface of the aluminum may be rendered readily absorptive to radiant heat by any desired method. The outer surface of the aluminum may be blackened and somewhat roughened, thereby rendering it readily absorptive to radiant heat so that the pan is ideally suited for baking in an oven employing radiant heat. This is especially true when the inside of the aluminum pan body is bright. Bright aluminum patches applied to the generally vertical edges of the pan externally thereof may be employed when the pan body is made of aluminum blackened on the outside and bright on the inside.

While I have shown and described certain present preferred embodiments of the invention it is to be distinctly understood that the invention is not limited thereto but may be otherwise variously embodied within the scope of the following claim.

I claim:

A sheet metal baking pan of rectangular shape having a radiant heat absorptive outer surface and having angular sectioned patches of radiant heat reflecting sheet metal secured along the generally vertical corners of the pan and extending a substantial distance from the corners along the sides of the pan and serving the duel function of reinforcing the corners of the pan and of retarding the penetration of heat through the corners of the pan to prevent overbaking of the corners of a loaf baked in the pan.

ASHLEY F. WARD.